US009686487B1

(12) United States Patent
Fish et al.

(10) Patent No.: US 9,686,487 B1
(45) Date of Patent: Jun. 20, 2017

(54) VARIABLE SCAN RATE IMAGE GENERATION

(71) Applicant: Lockheed Martin Corporation, Bethesda, MD (US)

(72) Inventors: Trisha Fish, Merritt Island, FL (US); Mark T. Myers, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 251 days.

(21) Appl. No.: 14/120,147

(22) Filed: Apr. 30, 2014

(51) Int. Cl.
  *H04N 5/353* (2011.01)
  *H04N 5/341* (2011.01)
  *H04N 5/378* (2011.01)
  *B64D 47/08* (2006.01)

(52) U.S. Cl.
  CPC .......... *H04N 5/3535* (2013.01); *B64D 47/08* (2013.01); *H04N 5/341* (2013.01); *H04N 5/378* (2013.01)

(58) Field of Classification Search
  CPC ...... H04N 5/3535; H04N 5/341; H04N 5/378; B64D 47/08
  USPC ........................................................ 348/144
  See application file for complete search history.

(56) References Cited

U.S. PATENT DOCUMENTS

| 4,767,937 | A | * | 8/1988 | Norsworthy | ............ | G01S 3/784 |
| | | | | | | 348/195 |
| 8,463,078 | B2 | | 6/2013 | Goodnough et al. | | |
| 8,937,639 | B2 | | 1/2015 | Kasunic et al. | | |
| 2006/0181483 | A1 | | 8/2006 | Ari | | |
| 2007/0058717 | A1 | | 3/2007 | Chosak et al. | | |
| 2007/0222981 | A1 | | 9/2007 | Ponsardin et al. | | |
| 2008/0025462 | A1 | * | 1/2008 | Sutko | ................. | G01N 21/6456 |
| | | | | | | 378/44 |
| 2009/0231598 | A1 | | 9/2009 | Kimura | | |
| 2010/0046853 | A1 | * | 2/2010 | Goodnough | ....... | H04N 5/37206 |
| | | | | | | 382/275 |
| 2012/0075513 | A1 | | 3/2012 | Chipman et al. | | |
| 2015/0215536 | A1 | | 7/2015 | Buell et al. | | |

OTHER PUBLICATIONS

Author Unknown, "Digital Focal-Plane Arrays," Tech Notes, MIT Lincoln Laboratory, 2010, retrieved from http://www.ll.mit.edu/publications/technotes/TechNote_DFPA.pdf, 2 pages.

(Continued)

*Primary Examiner* — Thai Tran
*Assistant Examiner* — Nien-Ru Yang
(74) *Attorney, Agent, or Firm* — Withrow & Terranova, PLLC

(57) ABSTRACT

Variable scan rate image generation is disclosed. A scanning device scans a scene with a detector array at a first constant scan rate. Photon accumulation values are iteratively transferred from each set of detector elements in the detector array to an adjacent set of detector elements at a first transfer rate based on the first constant scan rate. Photon accumulation values of one set of the plurality of sets are iteratively read out at the first transfer rate. The first constant scan rate is accelerated to a second constant scan rate, and photon accumulation values are iteratively transferred from each set to an adjacent set at a second transfer rate based on the second constant scan rate, and photon accumulation values of the at least one set of the plurality of sets are iteratively read out at the second transfer rate.

24 Claims, 8 Drawing Sheets

(56) References Cited

OTHER PUBLICATIONS

Author Unknown, "Staring array," Wikipedia, version modified Jan. 28, 2013, retrieved from http://en.wikipedia.org/w/index.php?title=Staring_array&oldid=535312116, 2 pages.
Brown, Matthew G. et al., "Digital-pixel Focal Plane Array Development," Quantum Sensing and Nanophotonic Devices VII, Proceedings of SPIE, vol. 7608, 2010, SPIE, 10 pages.
Christensen, Philip R. et al., "The Thermal Emission Imaging System (THEMIS) for the Mars 2001 Odyssey Mission," Space Science Reviews, vol. 110, 2004, Kluwer Academic Publishers, pp. 85-130.
Kelly, Michael W. et al., "Advances in Detectors: Digital-pixel FPAs enhance infrared imaging capabilities," LaserFocusWorld, vol. 49, Issue 1, Jan. 1, 2013, PennWell Corporation, 7 pages.
Tyrrell, Brian et al., "Time Delay Integration and In-Pixel Spatiotemporal Filtering Using a Nanoscale Digital CMOS Focal Plane Readout," IEEE Transactions on Electron Devices, vol. 56, No. 11, Nov. 2009, IEEE, pp. 2516-2523.
Notice of Allowance and Examiner-Initiated Interview Summary for U.S. Appl. No. 14/263,145, mailed Dec. 4, 2015, 10 pages.
Non-Final Office Action for U.S. Appl. No. 14/471,656, mailed Jan. 8, 2016, 15 pages.
Non-Final Office Action for U.S. Appl. No. 14/471,656, mailed Jul. 19, 2016, 19 pages.
Final Office Action for U.S. Appl. No. 14/471,656, mailed Jan. 23, 2017, 16 pages.

\* cited by examiner

VARIABLE SCAN RATE IMAGE GENERATION

TECHNICAL FIELD

The embodiments relate to generating imagery with a detector array, and in particular to generating imagery of a scene while scanning a field of regard at a variable scan rate.

BACKGROUND

It is often desirable to generate continuous imagery of a scene from an aircraft. Such imagery may be used for any number of different purposes, including, for example, identifying potential targets. This is sometimes accomplished by a system that includes a detector array of detector elements, such as a complementary metal-oxide-semiconductor (CMOS) detector array or a focal plane array. The detector array may be coupled to a gimbal that is configured to continuously scan the detector array around a field of regard of the gimbal. The system generates imagery based on image data generated by the detector array. Such imagery may be continuously rendered, for example, on a display in the cockpit of the aircraft and/or may be utilized by automated systems, such as target identification systems, to identify potential targets.

Often, such systems rely on time delay and integration (TDI) scanning technology to increase sensitivity. TDI scanning involves scanning a scene at a rate that is tied to a charge shift rate of the detector array, such that the accumulated charges shift at the same rate that the detector array is scanned across the scene. However, while TDI scanning facilitates greater sensitivity, it suffers from other drawbacks such as a need to maintain a constant scan rate to avoid blurring and smearing of the imagery that would otherwise occur if the scan rate differed from the charge shift rate. For instance, a constant scan rate inhibits the ability to scan interesting objects or regions of a scene at a slower scan rate than uninteresting objects or regions, which would increase information collection from such interesting objects or regions of the scene.

SUMMARY

The embodiments relate to variable scan rate image generation, wherein a scene may be scanned with a detector array by a scanning device at different scan rates, and the detector array transfers photon accumulation values at a rate that is based on a current scan rate. Among other features, the embodiments allow for areas within a scene that are determined to be of interest to be scanned at a slower scan rate than other areas within the scene, or alternatively, allow for areas within the scene to be scanned at a faster scan rate, without blurring or smearing, by dynamically altering a photon accumulation value transfer rate of the detector array to match the current scan rate.

In one embodiment, a method is provided. A scanning device scans, over a first period of time, a scene with a detector array that includes a plurality of sets of detector elements at a first constant scan rate. During the first period of time, photon accumulation values from each set of detector elements are iteratively transferred to an adjacent set of detector elements at a first transfer rate that is based on the first constant scan rate, and photon accumulation values from at least one set of detector elements of the plurality of sets of detector elements are iteratively read out at the first transfer rate. The first constant scan rate is accelerated to a second constant scan rate that differs from the first constant scan rate. During the second period of time, photon accumulation values from each set of detector elements are iteratively transferred to an adjacent set of detector elements at a second transfer rate that is based on the second constant scan rate, and the photon accumulation values of the at least one set of detector elements of the plurality of sets of detector elements are iteratively read out at the second transfer rate.

In one embodiment, while the scan rate is accelerated from the first constant scan rate to the second constant scan rate, photon accumulation values may be iteratively transferred from the sets of detector elements to the adjacent sets of detector elements at a changing scan rate based on an acceleration from the first constant scan rate to the second constant scan rate, and the photon accumulation values of the at least one set of detector elements of the plurality of sets of detector elements are iteratively read out at the changing scan rate. The acceleration may be increasing or may be decreasing.

In one embodiment, imagery of the scene is continually generated based on the photon accumulation values read out from the at least one set. In another embodiment, a method for reading out a detector array is provided. A scanning device scans, over a first period of time, a scene with a detector array at a first constant scan rate. The detector array includes a plurality of sets of detector elements, the detector elements in each set are arranged along a same imaginary line and are configured to quantify photons accumulated over a period of time. While the detector array is scanning the scene at the first constant scan rate over the first period of time, a controller iteratively signals the detector array to transfer photon accumulation values accumulated in each set of the plurality of sets to an adjacent set of the plurality of sets at a first transfer rate based on the first constant scan rate. For each iteration, photon accumulation values of at least one set of the plurality of sets are read out at the first transfer rate. The device accelerates the first constant scan rate to a second constant scan rate that differs from the first constant scan rate. During a second period of time, the controller iteratively signals the detector array to transfer photon accumulation values accumulated in each set of the plurality of sets to an adjacent set of the plurality of sets at a second transfer rate based on the second constant scan rate. For each iteration, photon accumulation values of at least one set of the plurality of sets are read out at the second transfer rate.

In one embodiment, while the scan rate is accelerated from the first constant scan rate to the second constant scan rate, the controller iteratively signals the detector array to transfer photon accumulation values accumulated in each set to an adjacent set at a changing scan rate based on an acceleration from the first constant scan rate to the second constant scan rate.

In one embodiment, a target identification module determines that a portion of the scene contains an item of interest. The scanning device positions the detector array with respect to a location within the scene in response to the determination. The portion of the scene that contains the item of interest is rescanned at a scan rate that differs from a scan rate at which the portion of the scene was previously scanned.

In another embodiment, an apparatus is provided. The apparatus includes a detector array that includes a plurality of sets of detector elements. A scanning device is configured to scan a scene with the detector array. A controller is configured to signal the scanning device to scan the scene with the detector array at a first constant scan rate over a first period of time. The controller iteratively signals the detector array to transfer photon accumulation values from sets of detector elements to adjacent sets of detector elements at a first transfer rate based on the first constant scan rate and iteratively read out the photon accumulation values of at least one set of the plurality of sets at the first constant scan rate. The controller signals the scanning device to accelerate the first constant scan rate to a second constant scan rate that differs from the first constant scan rate. The controller iteratively signals the detector array to transfer photon accumulation values from the sets of detector elements to the adjacent sets of detector elements at a second transfer rate based on the second constant scan rate, and iteratively reads out the photon accumulation values of the at least one set of the plurality of sets at the second transfer rate.

In yet another embodiment, a method for generating imagery is provided. A scene is scanned with a detector array at a first constant scan rate over a first period of time. The detector array is iteratively read out at a predetermined frame rate to generate a first plurality of successive first frames of image data over the first period of time. At least some of the first frames of image data depict a field of view (FOV) of the scene that at least partially overlaps a FOV of an immediately preceding first frame of image data. The first constant scan rate is accelerated to a second constant scan rate. The detector array is iteratively read out at the predetermined frame rate to generate a second plurality of successive second frames of image data over a second period of time while the scene is scanned by the detector array at the second constant scan rate. At least some of the second frames of image data depict a FOV that at least partially overlaps a FOV of an immediately preceding second frame of image data. Overlapping portions of the first plurality of successive first frames of image data are aligned based on the first constant scan rate and overlapping portions of the second plurality of successive second frames of image data are aligned based on the second constant scan rate to generate imagery of the scene.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first constant scan rate" and "second constant scan rate," and does not imply a priority, a type, an importance, or other attribute, unless otherwise stated herein. The term "about" used herein in conjunction with a numeric value means any value that is within a range of ten percent greater than or ten percent less than the numeric value.

The embodiments relate to variable scan rate image generation, wherein a scene may be scanned with a detector array by a scanning device at different scan rates, and wherein the detector array transfers photon accumulation values at a rate that is based on a current scan rate. Among other features, the embodiments allow for areas within a scene that are determined to be of interest to be scanned at a slower scan rate than other areas within the scene, or alternatively, allow for areas within the scene to be scanned at a faster scan rate, without blurring or smearing, by dynamically altering a photon accumulation value transfer rate of the detector array to match the current scan rate.

Figure 1:
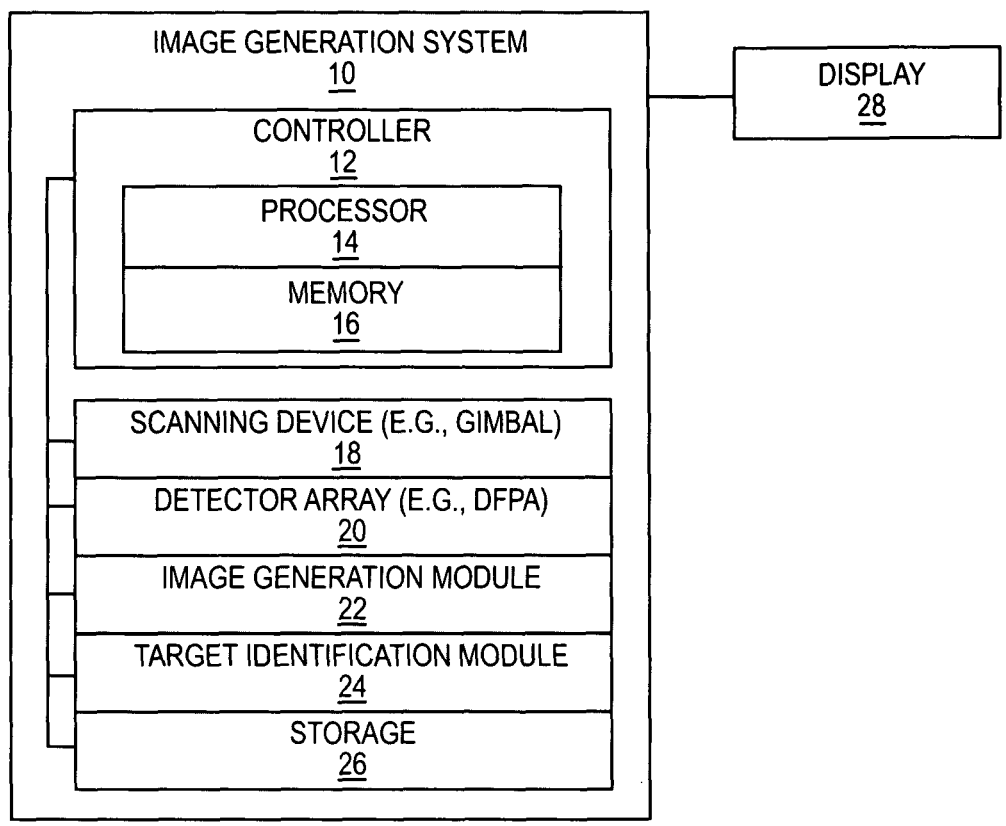
FIG. 1 is a block diagram of an image generation system according to one embodiment.

FIG. 1 is a block diagram of an image generation system 10 according to one embodiment. The image generation system 10 includes a controller 12 that comprises a processor 14 and a memory 16. The functionality disclosed herein may be implemented in software via programming instructions, in hardware, or via a combination thereof. To the extent functionality is implemented in software, the programming instructions implementing such functionality may be stored in the memory 16 and executed by the processor 14, thereby configuring the processor 14 to implement the functionality described herein.

The controller 12 may be communicatively coupled to a scanning device 18, such as, by way of non-limiting example, a gimbal, or a scan mirror. A detector array 20, such as, by way of non-limiting example, a digital focal plane array (DFPA), a complementary metal-oxide-semiconductor (CMOS) detector array, or a charge-coupled device (CCD) detector array, is configured to collect energy in the form of photons from a scene within a FOR of the scanning device 18. In particular, the detector array 20 comprises detector elements that are sensitive to photons in desired energy ranges. For example, if the detector array 20 comprises a DFPA, the detector array 20 may be sensitive to photons in the infrared frequencies. Alternatively, if the detector array 20 comprises a CMOS detector array, the detector array 20 may be sensitive to photons in the visible spectrum.

The detector array 20 quantifies the photons received by the detector elements via photon accumulation values. The photon accumulation values may comprise any mechanism suitable for quantifying photons collected over a period of time. In some embodiments, the photon accumulation values may be amounts of electric charge. In other embodiments, the photon accumulation values may be numeric values. In one embodiment, the detector array 20 comprises a DFPA wherein each detector element has corresponding circuitry that is configured to quantify photons received by the detector element over a period of time and output a numeric value corresponding to such accumulated photons.

The scanning device 18 scans a scene with the detector array 20 within a FOR of the scanning device 18. In one embodiment the scanning device 18 scans the scene with the detector array 20 by physically moving the detector array 20 in a desired direction across the scene. In another embodiment the scanning device 18 scans the scene with the detector array 20 by moving the scene with respect to the detector array 20, such as by reflecting, by a scan mirror, the scene across the detector array 20.

The image generation system 10 also includes an image generation module 22 that is configured to generate imagery of the scene within the FOR of the scanning device 18 based on photon accumulation values read out from the detector array 20. The image generation system 10 may also include a target identification module 24 that is configured to analyze the imagery generated by the image generation module 22 and identify potential targets from such imagery. The image generation system 10 may also include a storage 26 that may comprise, for example, a hard drive or flash drive suitable for storing information including, for example, programming instructions that may be used to implement all or some of the functionality described herein.

In some embodiments, the imagery generated by the image generation module 22 may be provided to a display 28 wherein users of the image generation system 10 may view the scene within the FOR of the scanning device 18 in real-time.

The image generation system 10 may be utilized in any number of different applications, including, by way of non-limiting example, aircraft such as fixed-wing or rotary-wing aircraft, marine vessels, such as a ship, ground vehicles, or may be implemented in a stationary device that continually scans a scene within a FOR of the scanning device 18. Thus, while the embodiments herein are discussed in terms of use of the image generation system 10 in an aircraft, the embodiments are not limited to use in an aircraft.

Figure 2A:
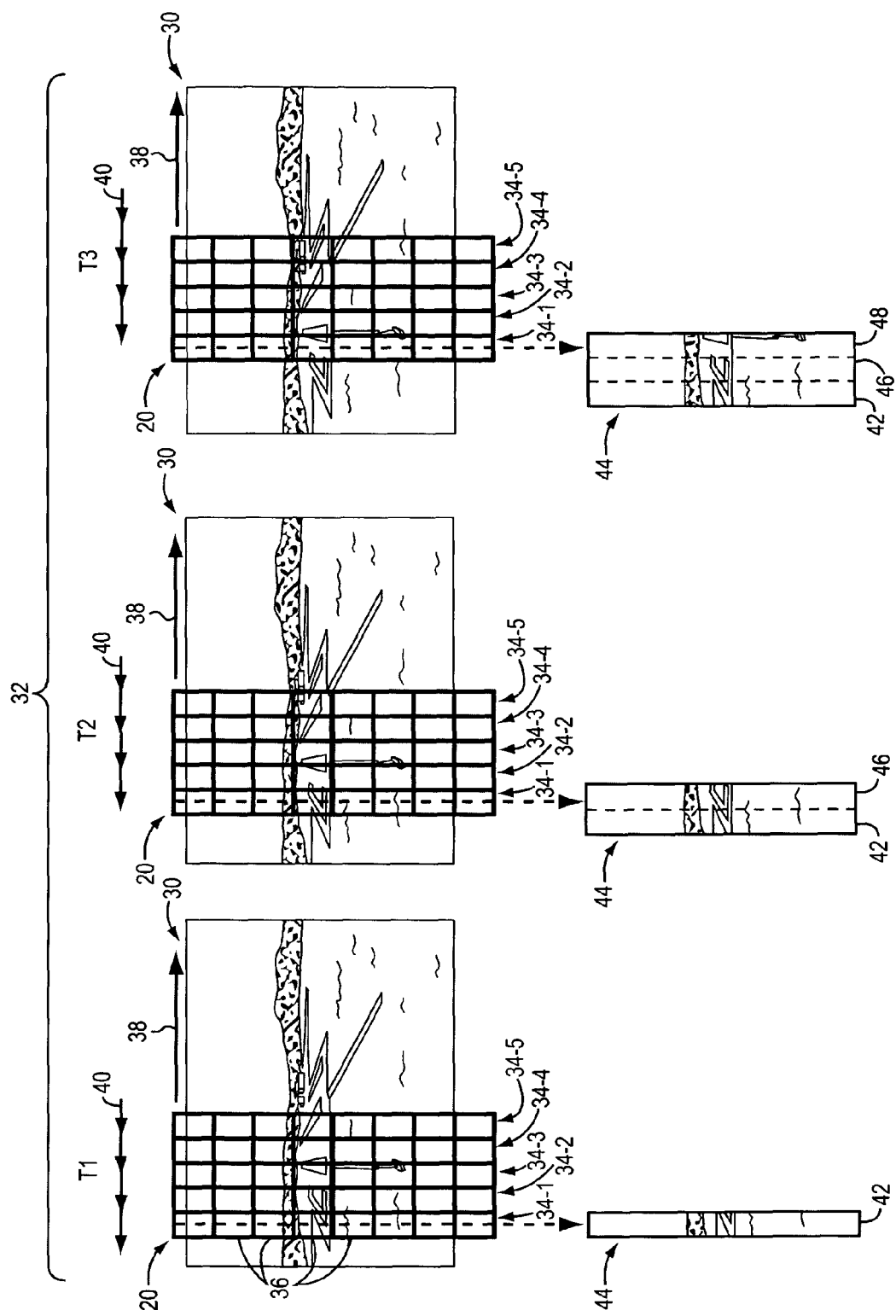
FIGS. 2A-2C illustrate, via block diagram, the scanning of a scene with a detector array according to one embodiment.
Figure 2B:
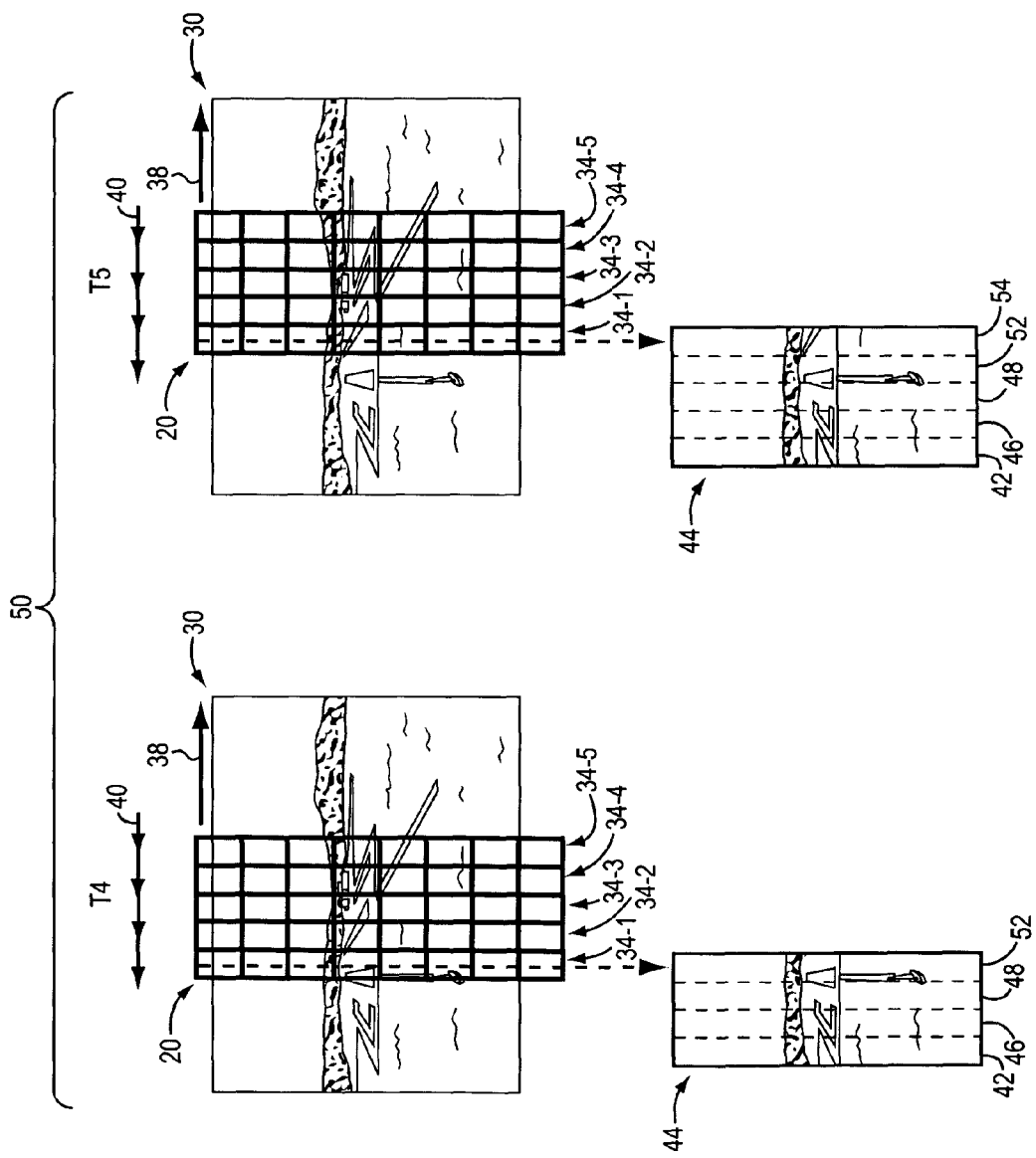
Figure 2C:
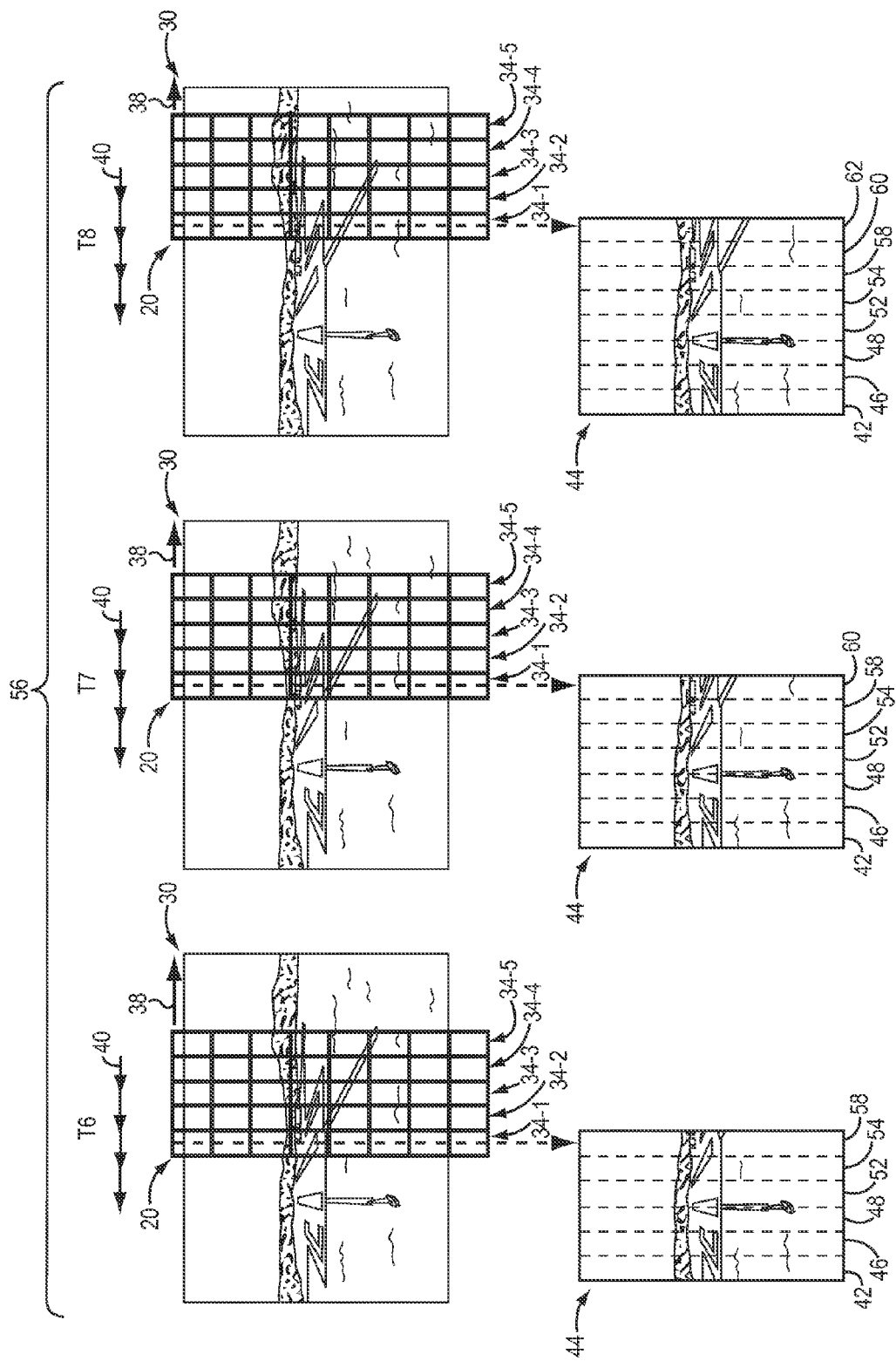

FIGS. 2A-2C illustrate the scanning of a scene 30 with the detector array 20 during three successive periods of time according to one embodiment. For purposes of illustration, the scanning device 18 will be discussed with respect to an embodiment wherein the scanning device 18 moves the detector array 20 across the scene 30 to scan the scene 30, but the embodiments are equally applicable to mechanisms which move the scene 30, such as by a scan mirror, across the detector array 20.

FIG. 2A illustrates the scanning of the scene 30 with the detector array 20 during a first period of time 32. The detector array 20 comprises a plurality of sets 34-1-34-5 (generally, sets 34) of detector elements 36. For purposes of illustration, only some of the detector elements 36 of the detector array 20 have been individually labeled. In this embodiment, the sets 34 of detector elements 36 are illustrated in a vertical, or column, grouping which is orthogonal to a horizontal direction 38 of travel of the detector array 20. However, in other embodiments, the detector array 20 may be moved in a vertical direction of travel, and in such embodiments, the sets 34 of the detector elements 36 may be grouped in a horizontal, or row, orientation. Generally, the detector elements 36 in each set 34 are arranged along an imaginary line that runs orthogonal to the direction 38 of travel of the detector array 20. While for purposes of illustration the detector array 20 is illustrated as having five sets 34 of detector elements 36, the embodiments are not limited to having any particular number of sets 34 of detector elements 36, or limited to any particular number of detector elements 36.

Assume, for purposes of illustration, that at a time T1 the detector array 20 has already been in operation for at least several seconds, and has been moved from a previous position to the current position indicated at the time T1. Assume further that the scene 30 is being scanned with the detector array 20 during the first period of time 32 at a first constant scan rate. In this embodiment, the detector array 20 is operating in a time delay and integration mode. Each set 34 of detector elements 36 continually accumulates energy, in the form of photons, from the scene 30. In one embodiment, the detector array 20 is a DFPA wherein each detector element 36 includes associated circuitry that quantifies the photons accumulated in terms of numeric values rather than in terms of electric charge. The first constant scan rate can comprise any desired scan rate, and in some embodiments, comprises a scan rate faster than about 360 degrees in four seconds. In some embodiments, the scan rate is faster than about 360 degrees in three seconds.

As the scene 30 is being scanned by the detector array 20 at the first constant scan rate, the controller 12, at a first rate that is based on the first constant scan rate, iteratively signals the detector array 20 to transfer the photon accumulation values accumulated in each set 34 in a downstream direction 40 to an immediately adjacent set 34. The transfer from each set 34 to an adjacent set 34 happens substantially concurrently, and in parallel for each iteration. Over multiple iterations, the photon accumulation values are thereby cascaded from sets 34 to adjacent sets 34 in the direction 40. During each iteration, photon accumulation values are read out from at least one set 34, such as the set 34-1, and may be stored in a buffer for processing, and for use in generating imagery of a respective "slice" of the scene 30 defined by a width of the detector elements 36 in a respective set 34.

As an example, at the time T1, the controller 12 may signal the detector array 20 to transfer the photon accumulation values in the detector elements 36 of the sets 34 to immediately adjacent sets 34. This signal causes, substantially in parallel, the photon accumulation values in the detector elements 36 of the set 34-5 to be transferred to immediately adjacent detector elements 36 in the set 34-4, the photon accumulation values in the detector elements 36 of the set 34-4 to be transferred to immediately adjacent detector elements 36 in the set 34-3, the photon accumulation values in the detector elements 36 of the set 34-3 to be transferred to immediately adjacent detector elements 36 in the set 34-2, the photon accumulation values in the detector elements 36 of the set 34-2 to be transferred to immediately adjacent detector elements 36 in the set 34-1, and the photon accumulation values in the detector elements 36 of the set 34-1 to be read out of the detector array 20. The photon accumulation values read out from the set 34-1 may be used by the image generation module 22 to generate a portion 42 of imagery 44 of the scene 30.

Because the controller 12 signals the detector array 20 to transfer the photon accumulation values at a first rate that is based on the first constant scan rate at which the scene 30 is scanned by the detector array 20, the imagery 44 is substantially blur- and smear-free, resulting in high-resolution imagery 44 of the scene 30. This same process is repeated at a time T2 of the first period of time 32, and the image generation module 22 generates a portion 46 of the scene 30 that represents that portion of the scene 30 immediately adjacent to the portion 42 generated at the time T1. Similarly, at a time T3 of the first period of time 32, the photon accumulation values of the detector elements 36 of the sets 34 are transferred in parallel in the direction 40 and read out from the set 34-1 to generate a portion 48 of the imagery 44 of the scene 30. In this manner, the imagery 44 of the scene 30 may be generated on a relatively continuous basis and utilized, for example, by the target identification module 24 to identify targets that may be located in the scene 30, and/or presented on the display 28 for use by a human.

So long as the readout rate of the set 34-1 is based on the first constant scan rate, the imagery 44 generated by the image generation module 22 may be blur- and smear-free. However, in some embodiments, it may be desirable to increase or decrease the scan rate of the scene 30 by the detector array 20. Decreasing the scan rate of the scene 30 by the detector array 20 allows for more photons to be accumulated per detector element 36 and, thus, facilitates greater information gathering from the scene 30. Additional information gathering may facilitate more accurate target identification and decrease the time for a determination to be made that an object in the scene 30 is a target. Increasing the scan rate of the scene 30 by the detector array 20 may be desirable, for example, if it is known that a respective portion of the scene 30 does not contain any objects of interest, and thus, the amount of time devoted to collecting information from such respective portion of the scene 30 should be minimized. Unfortunately, altering the scan rate of the scene 30 by the detector array 20 while maintaining the same transfer rate of photon accumulation values from respective set 34 to respective adjacent set 34 will result in blurring and smearing of the imagery 44, which decreases the ability to identify targets and results in low-resolution imagery 44.

In some embodiments, the scan rate of the scene 30 by the detector array 20 may be dynamically altered, and the transfer rate of the photon accumulation values is also dynamically altered such that various scan rates may be utilized while maintaining blur- and smear-free imagery 44. In this regard, FIG. 2B illustrates a second period of time 50 wherein the scan rate of the scene 30 by the detector array 20 is accelerated with respect to the scene 30 by the scanning device 18 from the first constant scan rate at which the scene 30 was scanned with the detector array 20 as illustrated in FIG. 2A to a second constant scan rate, as will be discussed with regard to FIG. 2C. The second constant scan rate may be a faster scan rate than the first constant scan rate or may be a slower scan rate than the first constant scan rate. Thus, the second period of time 50 represents an increase in acceleration or a decrease in acceleration. The controller 12 determines the rate of change in the scan rate from the first constant scan rate to the second constant scan rate, i.e., the accelerating scan rate, that occurs during the second period of time 50, and signals the detector array 20 to transfer the photon accumulation values from the sets 34 to adjacent sets 34 at the changing rate based on the accelerating scan rate occurring during the second period of time 50. The controller 12 may determine the accelerating scan rate from the first constant scan rate to the second constant scan rate based on known characteristics of the scanning device 18, such as a rate at which the scanning device 18 can move from one scan rate to another scan rate, or based on the use of position encoders or other measurement devices associated with the scanning device 18 that directly measure and report the current position of the scene 30 with respect to the detector array 20 to the controller 12. In other embodiments, an alternating scan pattern may be iterated over a plurality of successive scans of the scene 30. In such embodiments, imagery generated over the successive scans may be analyzed to identify reference points in the scene 30, and the accelerating scan rate can be determined based on the identified reference points. If the rate at which the controller 12 signals the detector array 20 to transfer the photon accumulation values from sets 34 to adjacent sets 34 is substantially the same as the rate at which the scan rate is accelerating from the first constant scan rate to the second constant scan rate, then blurring of the imagery 44 will be minimized. For example, at a time T4, the controller 12 determines a changing scan rate of the scene 30 by the detector array 20 and signals the detector array 20 to transfer the photon accumulation values from the sets 34 of the detector elements 36 at the changing scan rate, and the set 34-1 is read-out at the changing scan rate to generate a portion 52 of the imagery 44 of the scene 30. At a time T5, the controller 12 determines a changing scan rate and signals the detector array 20 to transfer photon accumulation values from the sets 34 to adjacent sets 34 of the detector elements 36 at the changing scan rate, and again, the set 34-1 is read-out at the changing scan rate to generate a portion 54 of the imagery 44 of the scene 30.

FIG. 2C illustrates the scanning of the scene 30 with the detector array 20 during a third period of time 56. The scene 30 is scanned with the detector array 20 during the third period of time 56 at a second constant scan rate that differs from the first constant scan rate discussed with regard to FIG. 2A. Again, based on the second constant scan rate, at a time T6, the controller 12 signals the detector array 20 to transfer the photon accumulation values from the detector elements 36 of the sets 34 to detector elements 36 of immediately adjacent sets 34. The set 34-1 is read-out, and a portion 58 of the imagery 44 of the scene 30 is generated. Based on the second transfer rate, at a time T7, the controller 12 signals the detector array 20 to transfer the photon accumulation values from the detector elements 36 of the sets 34 to detector elements 36 of immediately adjacent sets 34. The set 34-1 is read-out, and a portion 60 of the imagery 44 of the scene 30 is generated. Based on the second transfer rate, at a time T8, the controller 12 signals the detector array 20 to transfer the photon accumulation values from the detector elements 36 of the sets 34 to detector elements 36 of immediately adjacent sets 34. The set 34-1 is read-out and a portion 62 of the imagery 44 of the scene 30 is generated.

Figure 3:
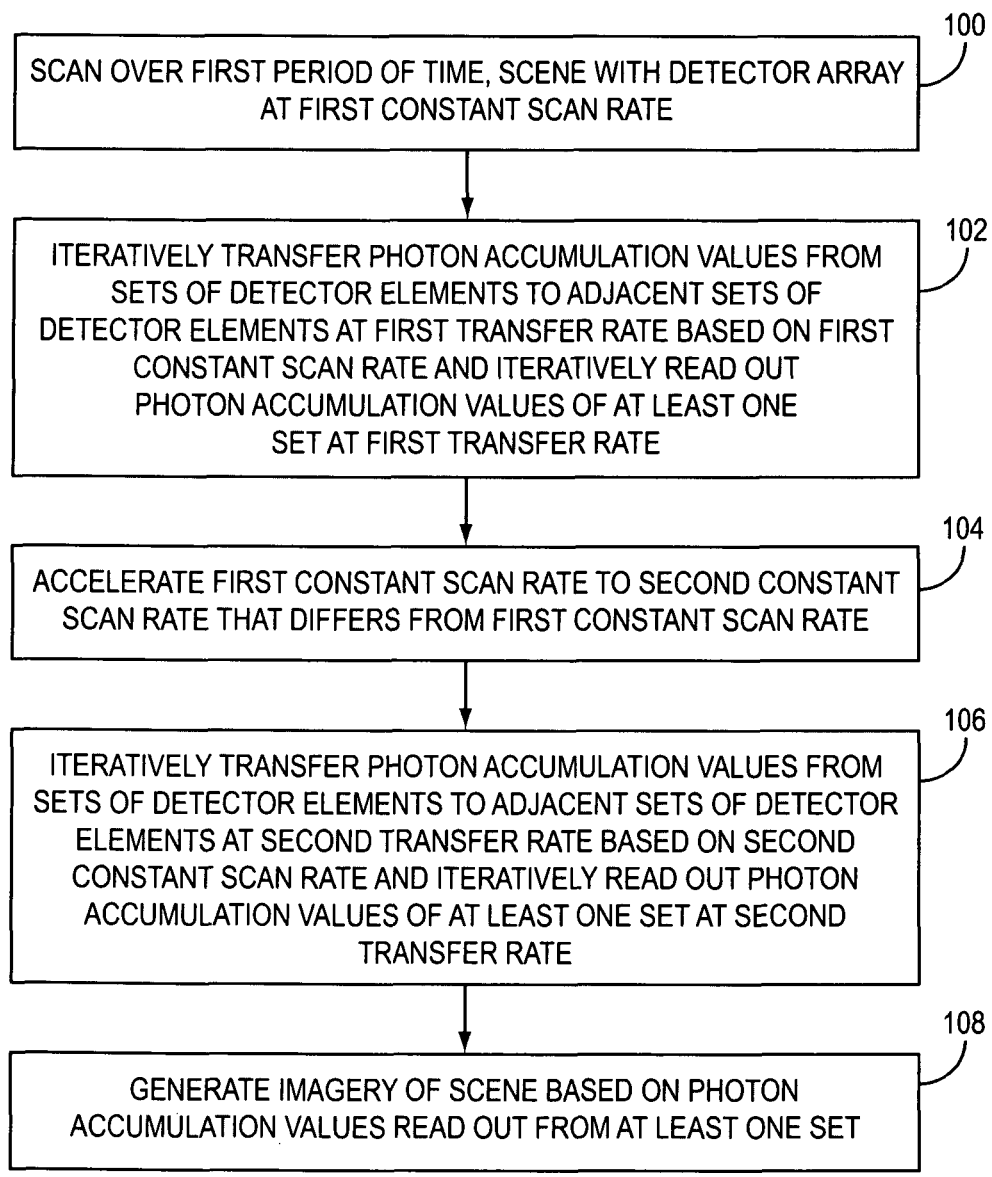
FIG. 3 is a flowchart of a method according to one embodiment.

FIG. 3 is a flowchart of a method according to one embodiment, and will be discussed in conjunction with FIGS. 2A-2C. Initially, the scanning device 18 scans the scene 30 with the detector array 20 at a first constant scan rate (FIG. 3, block 100). The controller 12 iteratively signals the detector array 20 to transfer photon accumulation values from each set 34 of detector elements 36 to an adjacent set 34 of detector elements 36 at a first transfer rate that is based on the first constant scan rate. Photon accumulation values of at least one set 34, such as the set 34-1, are also iteratively read-out at the first transfer rate (FIG. 3, block 102). The scanning device 18 accelerates the scan rate from the first constant scan rate to a second constant scan rate that differs from the first constant scan rate (FIG. 3, block 104).

The controller 12 signals the detector array 20 to iteratively transfer photon accumulation values from each set 34 of detector elements 36 to an adjacent set 34 of detector elements 36 at a second transfer rate that is based on the second constant scan rate. Photon accumulation values of the set 34-1 are also iteratively read-out at the second transfer rate (FIG. 3, block 106). The photon accumulation values read-out from the set 34-1 may be used to generate the imagery 44 (FIG. 3, block 108).

Figure 4A:
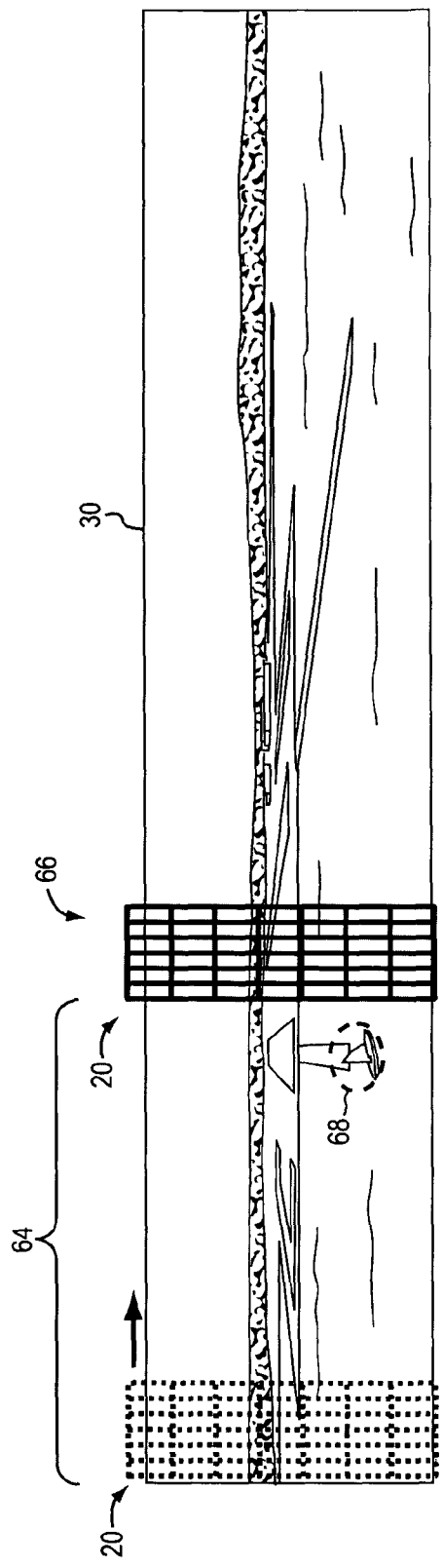
FIGS. 4A-4B are block diagrams of the detector array and the scene according to another embodiment.
Figure 4B:
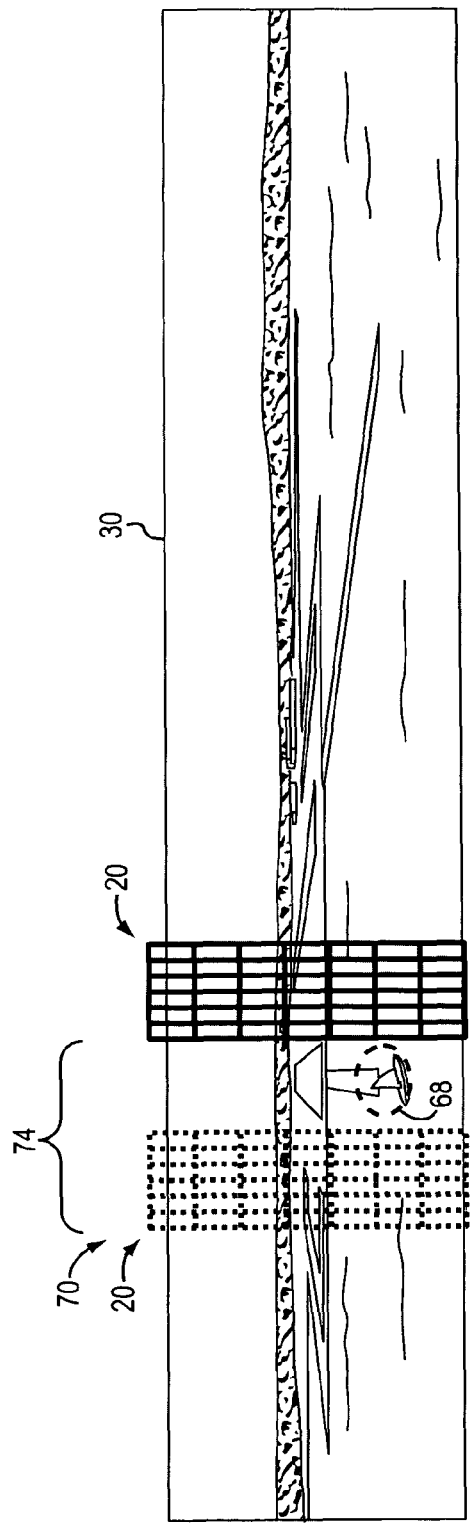

FIGS. 4A-4B are block diagrams of the detector array 20 and the scene 30 at different points in time according to another embodiment. Referring first to FIG. 4A, the scene 30 is scanned with the detector array 20 during a first period of time 64 at a first constant scan rate to a location 66 with respect to the scene 30. In this embodiment, the target identification module 24 analyzes the imagery 44 and determines that a portion of the scene 30 contains an item of interest 68. Referring now to FIG. 4B, the controller 12 signals the scanning device 18 to position the detector array 20 with respect to a location 70 of the scene 30. A portion 72 of the scene 30 that contains the item of interest 68 is rescanned at a second constant scan rate during a second period of time 74 that is less than the first constant scan rate at which the portion 72 was previously scanned to allow the detector elements 36 of the detector array 20 to gather additional energy in the form of photons from the portion 72 and item of interest 68, such that, for example, a determination can be made as to whether the item of interest 68 is properly identified as a target.

In another embodiment, the detector array 20 operates in a staring mode, and iteratively generates complete image frames of successive portions of the scene 30 within a field of view (FOV) of the detector array 20 at a relatively high frame rate, such that movement of the scene 30 with respect to the detector array 20 does not cause blurring or smearing. By way of non-limiting example, the detector array 20 may be configured to implement a 100 microsecond integration time, which is sufficiently fast to eliminate blurring that may otherwise be caused by the movement of the scene 30 with respect to the detector array 20. The image frames are subsequently summed and tiled based on the scan rate, or accelerating scan rate, at the time the image frames were generated. In some embodiments, as the image frames are generated, information such as a position of the detector array 20 with respect to the scene 30 is maintained such that the current scan rate, or accelerating scan rate, may be subsequently determined. In one embodiment, wherein the scanning device 18 comprises a scan mirror, a scan mirror position may be encoded into each image frame.

Figure 5:
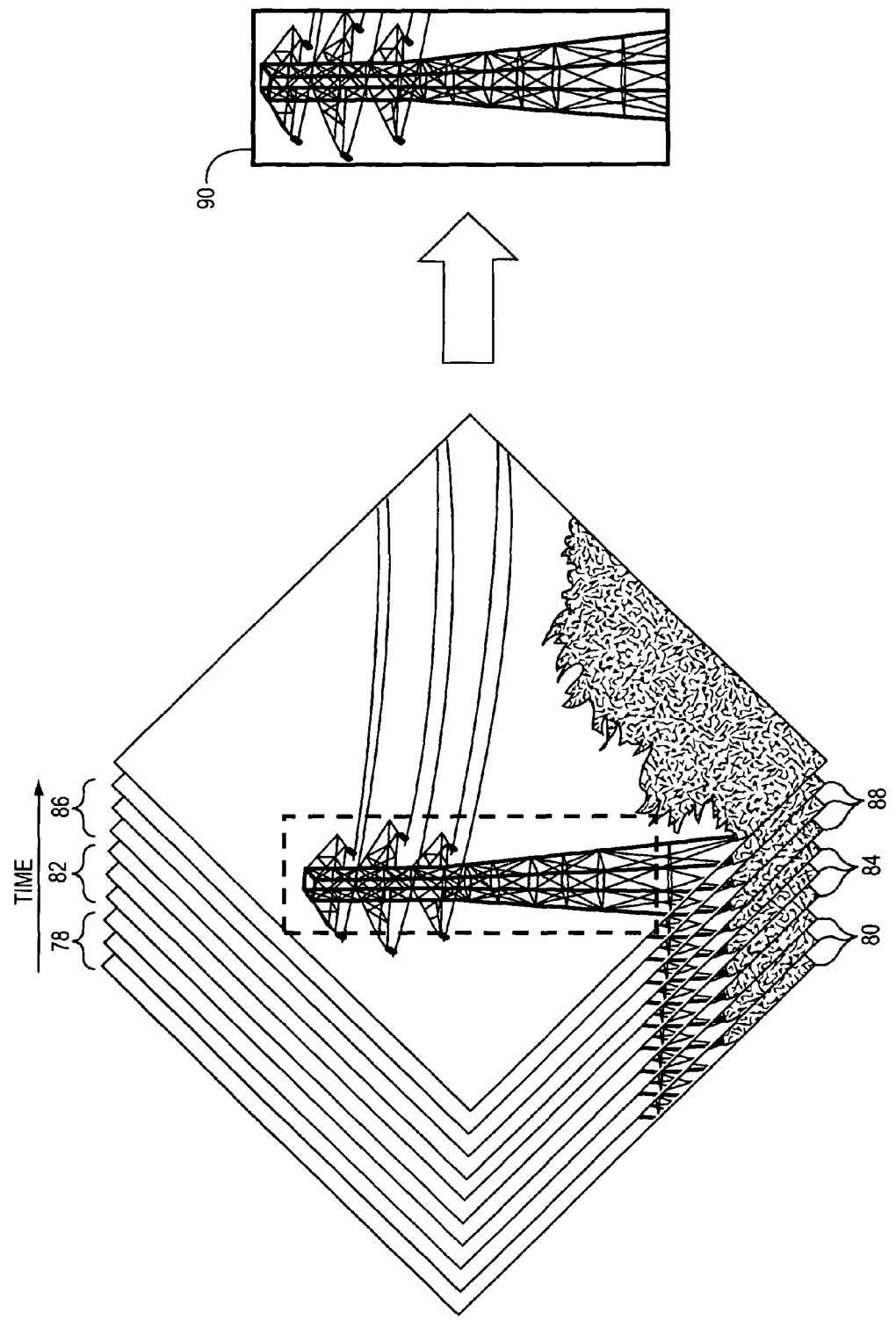
FIG. 5 is a block diagram of a plurality of image frames that may be generated by the detector array while in a staring mode.

In this regard, FIG. 5 is a block diagram of a plurality of image frames that may be generated by the detector array 20 while in a staring mode. In this embodiment, the detector array 20 is iteratively read out at a predetermined rate, such as, by way of non-limiting example, a 100 microsecond rate, over a first period of time 78 to generate a first plurality of successive first frames 80 of image data over the first period of time 78 while a scene is scanned with the detector array 20 with respect to a FOR of the scanning device 18 at a first constant scan rate in a first direction. Each first frame 80 of image data comprises a frame of image data collected from the detector array 20 and depicts a FOV within the FOR of the scanning device 18. Each first frame 80 of image data overlaps a FOV of an immediately preceding first frame 80 of image data. The first constant scan rate can comprise any desired scan rate, and in some embodiments, comprises a scan rate faster than about 360 degrees in four seconds. In some embodiments, the scan rate is faster than about 360 degrees in three seconds.

The scanning device 18 may then accelerate the scanning of the scene with the detector array 20 over a second period of time 82 to a second constant scan rate. During the second period of time 82 while the scan rate is accelerating from the first constant scan rate to the second constant scan rate, the detector array 20 generates a second plurality of successive second frames 84 of image data at the predetermined rate, which, in this example, may comprise a 100 microsecond rate. The second frames 84, despite the changing scan rate of the detector array 20 with respect to the scene, do not contain blurred or smeared imagery due to the relatively high frame rate of the detector array 20. The accelerating scan rate during the second period of time 82 may be increasing or decreasing.

During a third period of time 86, the detector array 20 is iteratively read out at the predetermined rate, to generate a third plurality of successive third frames 88 of image data while the scene is scanned with the detector array 20 with respect to the FOR of the scanning device 18 at a second constant scan rate. Each third frame 88 of image data comprises a frame of image data collected from the detector array 20 and depicts a FOV within the FOR of the scanning device 18.

In some embodiments, while the first frames 80, second frames 84, and third frames 88 are being generated, information, such as a position of the detector array 20 with respect to the scene may be encoded in each first frame 80, second frame 84, and third frame 88 of image data. This information may be utilized to align, or sum, overlapping portions of the first frames 80 of image data based on the first constant scan rate during the first period of time 78, to align, or sum, overlapping portions of the second frames 84 of image data based on the accelerating scan rate during the second period of time 82, and to align, or sum, overlapping portions of the third frames 88 of image data based on the second constant scan rate during the third period of time 86, and generate a single image 90 that is derived from the multiple different image frames 80, 84, and 88.

Figure 6:
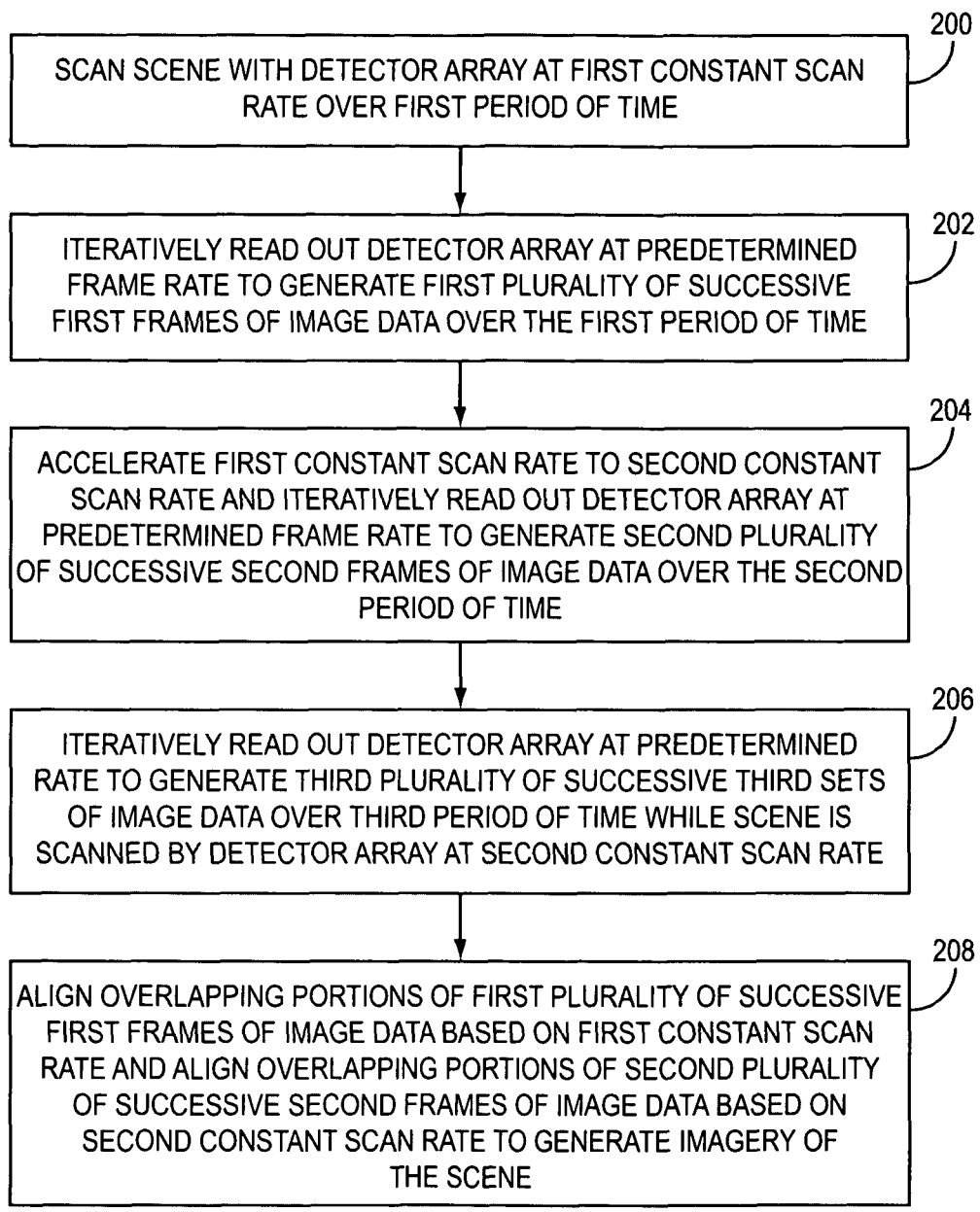
FIG. 6 is a flowchart of a method according to one embodiment.

FIG. 6 is a flowchart of a method of the embodiment discussed above with regard to FIG. 5, and will be discussed in conjunction with FIG. 5. Initially, the scene is scanned with the detector array 20 at a first constant scan rate over the first period of time 78 (FIG. 6, block 200). The detector array 20 is iteratively read out at a predetermined frame rate to generate the first plurality of successive first frames 80 of image data over the first period of time 78 (FIG. 6, block 202). The first constant scan rate is accelerated to a second constant scan rate during the second period of time 82. During the second period of time 82, the detector array 20 may be iteratively read out at the predetermined rate to generate the second plurality of successive second frames 84 (FIG. 6, block 204). The detector array 20 is then iteratively read out at a predetermined rate to generate the third plurality of successive third frames 88 of image data over the third period of time 86 while the scene is scanned with the detector array 20 at the second constant scan rate (FIG. 6, block 206). The overlapping portions of the first plurality of successive first frames 80 of image data may be aligned based on the first constant scan rate during the first period of time 78. The overlapping portions of the second plurality of successive second frames 84 may be aligned based on the accelerating scan rate during the second period of time 82, and the overlapping portions of the third plurality of successive third frames 88 of image data may be aligned based on the second constant scan rate during the third period of time 86, to generate imagery 90 (FIG. 6, block 208).

Those skilled in the art will recognize improvements and modifications to the preferred embodiments of the disclosure. All such improvements and modifications are considered within the scope of the concepts disclosed herein and the claims that follow.

What is claimed is:

1. A method, comprising:
scanning, by a scanning device, over a first period of time, a scene with a detector array comprising a plurality of sets of detector elements at a first constant scan rate;
iteratively, during the first period of time, transferring photon accumulation values from each set of detector elements to an adjacent set of detector elements at a first transfer rate that is based on the first constant scan rate, and iteratively reading out the photon accumulation values from at least one set of detector elements of the plurality of sets of detector elements at the first transfer rate;
accelerating the first constant scan rate to a second constant scan rate that differs from the first constant scan rate; and
iteratively, during a second period of time, transferring photon accumulation values from each set of detector elements to an adjacent set of detector elements at a second transfer rate that is based on the second constant scan rate, and iteratively reading out the photon accumulation values of the at least one set of the plurality of sets at the second transfer rate.

2. The method of claim 1, further comprising:
while the first constant scan rate is accelerated to the second constant scan rate, iteratively transferring photon accumulation values from each set of detector elements to an adjacent set of detector elements at a changing transfer rate based on an acceleration from the first constant scan rate to the second constant scan rate, and iteratively reading out the photon accumulation values of the at least one set of detector elements at the changing transfer rate.

3. The method of claim 2, wherein the acceleration is increasing.

4. The method of claim 2, wherein the acceleration is decreasing.

5. The method of claim 1, further comprising generating imagery of the scene based on the photon accumulation values read out from the at least one set of detector elements.

6. A method, comprising:
scanning, by a scanning device, over a first period of time, a scene with a detector array at a first constant scan rate, the detector array comprising a plurality of sets of detector elements, the detector elements in each set arranged along a same imaginary line and configured to quantify photons accumulated over a period of time;
while the detector array is scanning the scene at the first constant scan rate over the first period of time, iteratively signaling, by a controller, the detector array to transfer photon accumulation values accumulated in each set of the plurality of sets to an adjacent set of the plurality of sets at a first transfer rate based on the first constant scan rate, and for each iteration, reading out the photon accumulation values of at least one set of the plurality of sets at the first transfer rate;
accelerating, by the scanning device, the first constant scan rate to a second constant scan rate that differs from the first constant scan rate; and
during a second period of time, iteratively signaling, by the controller, the detector array to transfer the photon accumulation values accumulated in each set of the plurality of sets to an adjacent set of the plurality of sets at a second transfer rate based on the second constant scan rate, and for each iteration, reading out the photon accumulation values of at least one set of the plurality of sets at the second transfer rate.

7. The method of claim 6, further comprising:
while the first constant scan rate is accelerated to the second constant scan rate, iteratively signaling, by the controller, the detector array to transfer in the downstream direction photon accumulation values accumulated in each set to an adjacent set at a changing rate based on an acceleration from the first constant scan rate to the second constant scan rate.

8. The method of claim 7, wherein the acceleration is increasing.

9. The method of claim 7, wherein the acceleration is decreasing.

10. The method of claim 6, further comprising generating imagery of the scene based on the photon accumulation values read out from the at least one set.

11. The method of claim 10, further comprising:
determining, by a target identification module based on the imagery, that a portion of the scene previously scanned contains an item of interest;
positioning, by the scanning device, the detector array with respect to a location within the scene in response to determining that the portion of the scene depicts the item of interest; and
rescanning the portion of the scene that contains the item of interest with the detector array at a scan rate that differs from a scan rate at which the portion of the scene was previously scanned.

12. The method of claim 10, further comprising presenting the imagery on a display device.

13. An apparatus, comprising:
a detector array comprising a plurality of sets of detector elements;
a scanning device configured to scan a scene with the detector array; and
a controller configured to:
signal the scanning device to scan the scene with the detector array at a first constant scan rate over a first period of time;
iteratively signal the detector array to transfer photon accumulation values from each set of detector elements to an adjacent set of detector elements at a first transfer rate based on the first constant scan rate over the first period of time, and iteratively read out the photon accumulation values of at least one set of the plurality of sets at the first transfer rate;
signal the scanning device to accelerate the first constant scan rate to a second constant scan rate; and
iteratively signal the detector array to transfer photon accumulation values from each set of detector elements to an adjacent set of detector elements at a second transfer rate based on the second constant scan rate over a second period of time, and iteratively read out the photon accumulation values of the at least one set of the plurality of sets at the second transfer rate.

14. The apparatus of claim 13, wherein the controller is further configured to:
while the first constant scan rate is accelerated to the second constant scan rate, iteratively signal the detector array to transfer photon accumulation values in each set of detector elements to an adjacent set of detector elements at a changing transfer rate based on an acceleration from the first constant scan rate to the second constant scan rate, and to iteratively read out the photon accumulation values of the at least one set of detector elements at the changing transfer rate.

15. The apparatus of claim 14, wherein the acceleration is increasing.

16. The apparatus of claim 14, wherein the acceleration is decreasing.

17. The apparatus of claim 13, wherein the controller is further configured to generate imagery of the scene based on the photon accumulation values read out from the at least one set.

18. The apparatus of claim 13, further comprising:
a target identification module coupled to the controller, and configured to make a determination that a portion of the scene previously scanned contains an item of interest; and
wherein the controller is further configured to:
position the detector array with respect to a location within the scene in response to the determination; and
signal the scanning device to rescan the portion of the scene that contains the item of interest with the detector array at a scan rate that differs from a scan rate at which the portion of the scene was previously scanned.

19. A method, comprising:
scanning a scene with a detector array at a first constant scan rate over a first period of time;
iteratively reading out the detector array at a predetermined frame rate to generate a first plurality of successive first frames of image data over the first period of time, at least some of the first frames of image data depicting a field of view (FOV) of the scene that at least partially overlaps a FOV of an immediately preceding first frame of image data;
accelerating the first constant scan rate to a second constant scan rate;
iteratively reading out the detector array at the predetermined frame rate to generate a second plurality of successive second frames of image data over a second period of time while scanning the scene by the detector array at the second constant scan rate, at least some of the second frames of image data depicting a FOV that at least partially overlaps a FOV of an immediately preceding second frame of image data; and
aligning overlapping portions of the first plurality of successive first frames of image data based on the first constant scan rate and aligning overlapping portions of the second plurality of successive second frames of image data based on the second constant scan rate to generate imagery of the scene.

20. The method of claim 19, further comprising storing the first constant scan rate in association with the first plurality of successive first frames of image data and the second constant scan rate in association with the second plurality of successive second frames of image data.

21. The method of claim 19, further comprising:
iteratively reading out the detector array at the predetermined rate to generate a third plurality of successive third frames of image data over a third period of time while the first constant scan rate is accelerated to the second constant scan rate, each third frame of image data depicting a FOV that at least partially overlaps a FOV of an immediately preceding third frame of image data; and
aligning overlapping portions of the third plurality of successive third frames of image data based on an acceleration from the first constant scan rate to the second constant scan rate to generate the imagery.

22. A system, comprising:
a detector array;
a scanning device configured to scan a scene with the detector array; and
a controller coupled to the scanning device and the detector array, and configured to:
signal the scanning device to scan the scene with the detector array at a first constant scan rate over a first period of time;
iteratively read out the detector array at a predetermined frame rate to generate a first plurality of successive first frames of image data over the first period of time, at least some of the first frames of image data depicting a field of view (FOV) of the scene that at least partially overlaps a FOV of an immediately preceding first frame of image data;
signal the scanning device to accelerate the first constant scan rate to a second constant scan rate;
iteratively read out the detector array at the predetermined frame rate to generate a second plurality of successive second frames of image data over a second period of time while scanning the scene by the detector array at the second constant scan rate, at least some of the second frames of image data depicting a FOV that at least partially overlaps a FOV of an immediately preceding second frame of image data; and
align overlapping portions of the first plurality of successive first frames of image data based on the first constant scan rate and aligning overlapping portions of the second plurality of successive second frames of image data based on the second constant scan rate to generate imagery of the scene.

23. The system of claim 22, wherein the first constant scan rate comprises a scan rate faster than about 360 degrees in four seconds.

24. The system of claim 23, wherein the second constant scan rate comprises a scan rate slower than about 360 degrees in four seconds.

* * * * *